(12) United States Patent
Osterhart et al.

(10) Patent No.: US 6,588,726 B2
(45) Date of Patent: Jul. 8, 2003

(54) LOAD BEARING SOLENOID OPERATED VALVE AND METHOD OF MAKING SAME

(75) Inventors: Daniel J. Osterhart, Birmingham, MI (US); Lewis W. Lake, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 80 days.

(21) Appl. No.: 09/905,518

(22) Filed: Jul. 13, 2001

(65) Prior Publication Data

US 2003/0010951 A1 Jan. 16, 2003

(51) Int. Cl.⁷ .................................................. F16K 31/02
(52) U.S. Cl. .............................. 251/129.02; 251/129.21
(58) Field of Search ...................... 257/129.02, 129.21, 257/129.15, 129.08

(56) References Cited

U.S. PATENT DOCUMENTS

| | | | | |
|---|---|---|---|---|
| 4,531,708 A | * | 7/1985 | Livet ...................... | 251/129.02 |
| 4,655,249 A | * | 4/1987 | Livet ...................... | 251/129.02 |
| 4,696,379 A | * | 9/1987 | Yamamoto et al. ..... | 251/129.21 |
| 4,783,049 A | * | 11/1988 | Northman et al. ..... | 251/129.15 |
| 4,947,893 A | * | 8/1990 | Miller et al. ........... | 251/129.15 |
| 5,011,113 A | * | 4/1991 | Stobbs et al. .......... | 251/129.21 |
| 5,788,213 A | * | 8/1998 | Kanda et al. .......... | 251/129.02 |

* cited by examiner

*Primary Examiner*—Ehud Gartenberg
*Assistant Examiner*—John Bastianelli
(74) *Attorney, Agent, or Firm*—Roger A. Johnston

(57) ABSTRACT

A load bearing solenoid operated valve having a one piece body with threads on opposite ends thereof for connection to a system placing the valve in tension or compression. An inlet port is formed in one end of the body and a plurality of cross ports are formed to communicate with the inlet. A sleeve valve/armature member which is magnetizable is slidably received over the body and has radial ports which are moved axially for valving the body cross ports. An annular flux collector ring and a pole piece are disposed on the body on opposite axial sides of the sleeve valve. A bobbin with coil thereon is received over the body and sleeve and a magnetically permeable cover over the coil completes the flux loop about the coil.

22 Claims, 3 Drawing Sheets

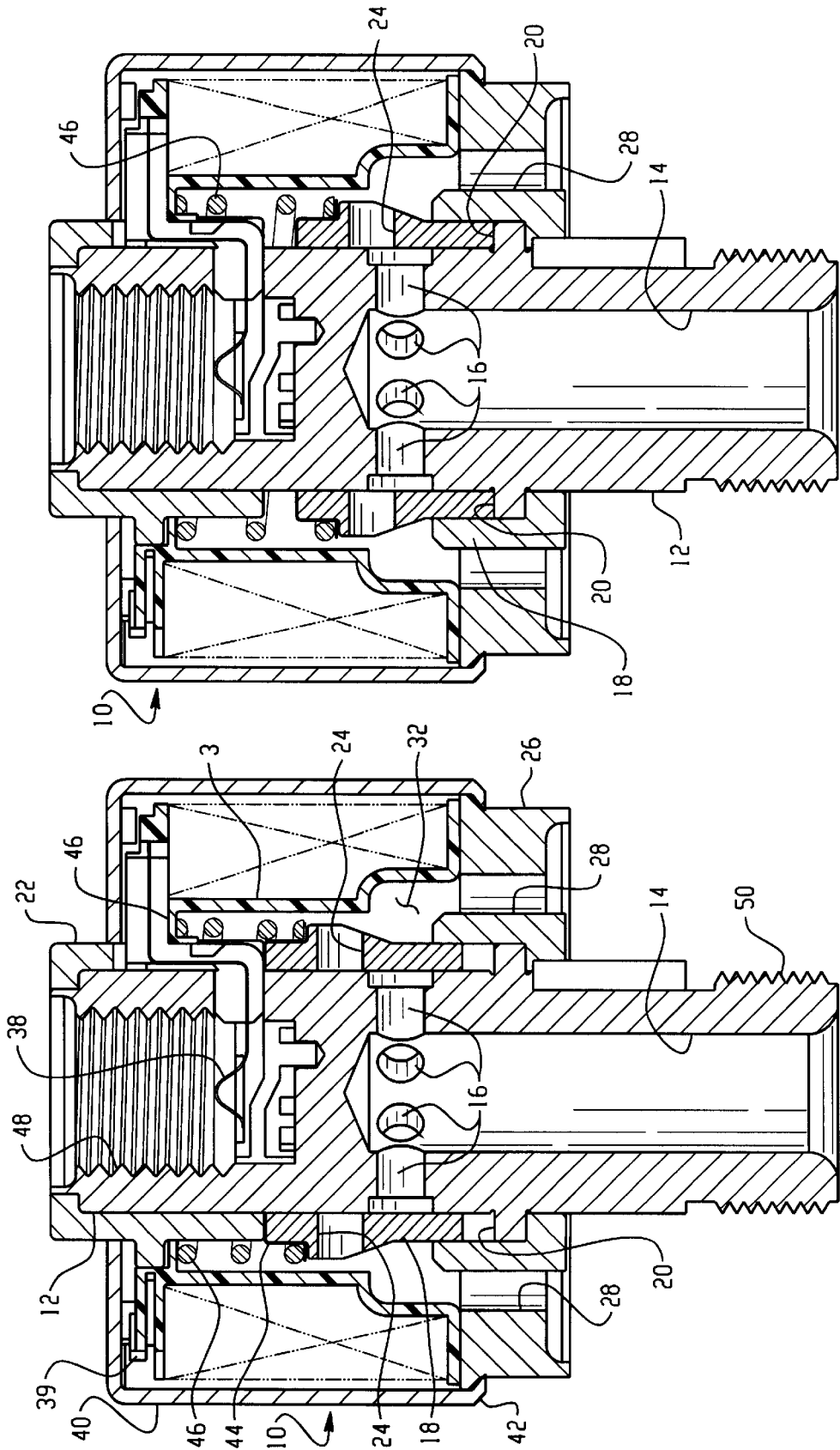

LOAD BEARING SOLENOID OPERATED VALVE AND METHOD OF MAKING SAME

BACKGROUND OF THE INVENTION

The present invention relates to solenoid operated hydraulic valves which are mounted as part of a load bearing assembly such as a damper rod employed in a motor vehicle suspension system. Solenoid operated hydraulic valves employed for such applications are subjected to cyclic tensile and compressive loads on the structural components thereof which are often aligned in sequence along the central axis of the solenoid armature for achieving efficiency and economy in manufacturing and assembly.

As a load bearing member in a suspension system, the valve must meet certain dimensional requirements in addition to having a load bearing capability; and, heretofore has resulted in an assembly of components by weldment and threaded connections which has been found to be prohibitively expensive for high volume mass production of motor vehicle components particularly for passenger car and light truck applications. Furthermore, severe limitations in allowable dimensional variations have often required post assembly machining operations which have added to the manufacturing costs.

A known valve assembly is shown in FIG. 4 with a first load bearing end member 1 threadingly engaging a second annular body member 2 with a flux collector ring member 3 attached to a shoulder or body member 2. Load bearing member 1 has internal threads 1A formed in the upper end thereof for attachment to a load applying member. The lower end of body member 2 is provided with an inlet port 6. The moveable armature/valve member 4 and pole piece 5 and a ported sleeve member 7 are disposed between members 1 and 2 prior to threaded assembly thereof. The assembly of FIG. 4 is thus relatively complex by virtue of the plurality of parts and their joining and is relatively costly to fabricate and assemble in mass production.

Thus, it has been desired to provide a solenoid operated hydraulic valve assembly which is intended to function as a load bearing member in an assembly and to provide such a device which is easy to assemble and install and is relatively low in manufacturing costs.

BRIEF SUMMARY OF THE INVENTION

The present invention provides a solenoid operated hydraulic valve intended for use as a structural load bearing member in an assembly and has a load bearing surface on oppositely disposed ends thereof with an inlet port aligned with the load bearing surfaces on a one piece valve body having a side port formed therein which communicates with the inlet port. An annular flux collector is disposed on the body and a sleeve having magnetically permeable material is disposed over the side port and movable on the body for opening and closing the side port. An annular pole piece is disposed on the body remotely from the flux collector and a coil of electrically conductive material is disposed about the sleeve which is moved upon energization of the coil.

In the preferred embodiment, the load bearing surfaces and the inlet port are coaxially aligned and an outlet port communicating with the side port is provided and is disposed to discharge in a direction generally parallel to the inlet port. The present invention thus provides a unique and novel load bearing solenoid operated hydraulic valve assembly which has a one piece body with an inlet port formed therein for insertion as a load bearing member in a fluid operated system.

BRIEF DESCRIPTION OF THE DRAWINGS

FIG. 1 is a cross section valve of the present assembly and the energized state with the side port closed;

FIG. 2 is a view similar to FIG. 1 with the valve in the de-energized conditions with the side port open;

DETAILED DESCRIPTION OF THE INVENTION

Figure 3:
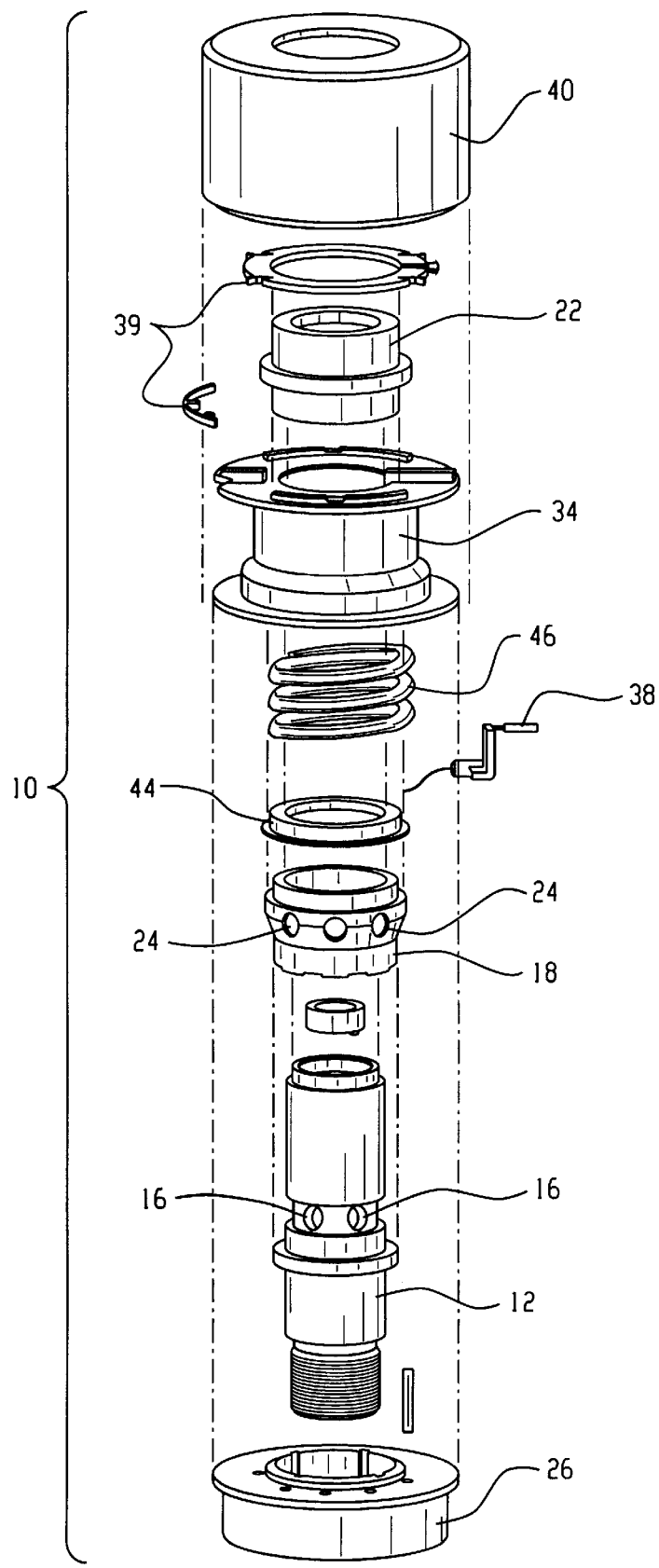
FIG. 3 is a exploded view of the valve of the present invention.
Figure 4:
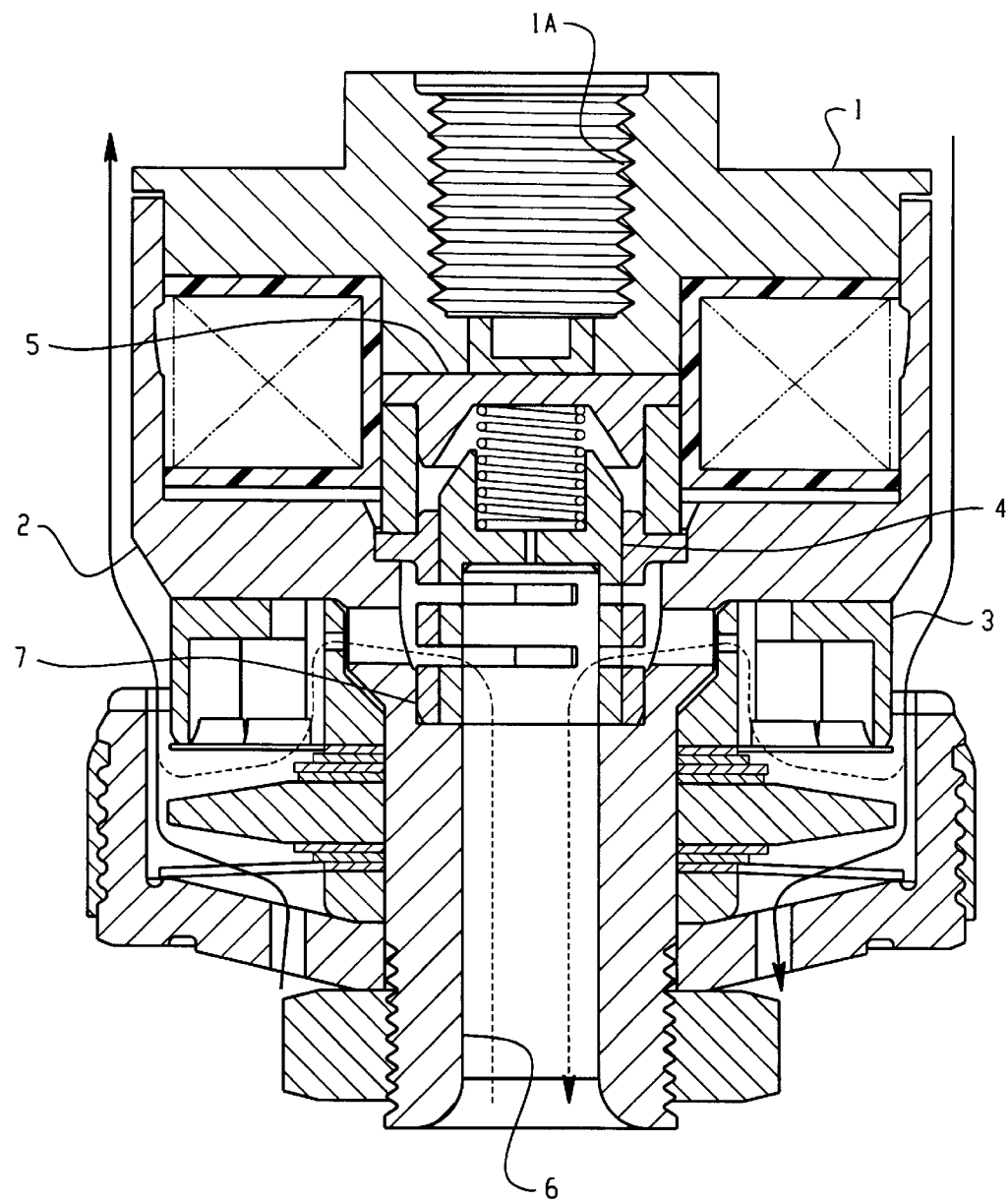
FIG. 4 is a cross section of a prior art valve assembly.

Referring to FIGS. 1, 2 and 3, the valve assembly of the present invention is indicated generally at 10 which has a unitary or one piece body member 12 preferably having a cylindrical configuration with an inlet port or bore 14 formed in the lower end thereof which inlet port extends upwardly to communicate with at least one and preferably a plurality of circumferentially spaced side ports 16.

An annular sleeve member 18 is slidably disposed over the body 12 and retained thereon by a flange 20 formed on the lower end of the body. A pole piece member, which is magnetizable, is secured on the upper end of the body denoted by reference numeral 22.

The sleeve 18 includes at least one, and preferably a plurality, of circumferentially spaced radially extending ports 24 which are located thereon so as to permit opening and closing of the side port 16 by vertical movement of the sleeve 18 between the flange 20 and the lower end of the upper pole piece 22.

A flux collector having a ring like or annular configuration is received over the lower end of the body as denoted by reference numeral 26; and, in the presently preferred practice, flux collector 26 has the outlet port or ports 28 formed therein and extending axially in a generally parallel arrangement with the inlet port 14. The outlet ports 28 communicate with the ports 24 in the sleeve 18. Although the outlet ports are disposed in the flux collector 26 in the presently preferred embodiment and extend in parallel arrangement with the inlet port 14, it will be understood that if other arrangements and orientations of the outlet ports are desired, the ports 28 may alternatively be located in members of the valve other than the flux collector 26.

The flux collector 26 provides an annular fluid chamber indicated by reference numeral 32 which surrounds sleeve 18 and communicates the outlet ports 28 with the cross ports 24 in the sleeve 18.

A bobbin member 30 is received over the body 12. A coil of electrically conductive material is disposed about the bobbin as denoted by reference numeral 36 and is connected to electrical terminals such as terminals 38, 39 disposed in the body and extending outwardly through the upper flange of the bobbin. It will be understood that the terminals 38, 39 are adapted for external electrical connection thereto.

An outer casing or can of magnetically permeable material is disposed over the bobbin and coil as denoted by reference numeral 40 and is secured to the flux collector 26 by any suitable fastening, preferably by material deformation, as for example by a rolled-in or crimped flange 42. However, it will be understood that other expedients may be employed for detaching the can 40 to the flux collector 26. The sleeve is shown in its upward limit position in FIG. 1 closing the cross ports 34 and closing a working air gap with the upper pole piece 22. The sleeve is in the position shown in FIG. 1 when the coil is fully energized.

An annular ring or clip 44 is disposed over the upper end of the sleeve 18 and has registered thereagainst the lower end of a spring 46 which has its upper end registered against an inwardly extending flange 48 formed on the bobbin. The spring 46 thus serves to bias the clip against the sleeve and urges the sleeve in a downward or open position.

Referring to FIG. 2, the valve assembly 10 is shown in the de-energized state wherein the spring 46 has moved the sleeve 18 downwardly causing the lower end thereof to engage the upper surface of flange 20 of the body. In the position of the sleeve shown in FIG. 2, the exhaust ports 24 and the sleeve open the side ports 16 in the body to communicate with the outlet port 28.

The upper end of the body 12 has an internal thread 48 formed therein for connection to a first load applying member (not shown). The lower end of the body 12 has external threads 50 provided thereon which are adapted for connection to a second load applying member (not shown) which is intended to apply a load oppositely directed from the load applied to the upper end of body 12.

The present invention thus provides a solenoid operated hydraulic valve which has a unitary one piece body member for attachment at the opposite ends thereof to load applying members for use in a system requiring the valve to be subjected to tensile or compressive loads. The valve of the present invention preferably has the inlet port and the load bearing surfaces on the ends thereof disposed in coaxial arrangement. The inlet port end of the valve is preferably attached to the load applying member with external threads; and, the opposite end of the valve from the inlet port is preferably provided with internal threads for connection to a load applying member. The unique annular sleeve valve member of the present invention surrounds the body and serves as an armature and controls flow through side ports communicating with the inlet port. The valve of the present invention thus provides a unique one piece body construction which minimizes manufacturing costs and simplifies the construction of the valve and provides robustness in service.

Although the invention has hereinabove been described with respect to the illustrated embodiments, it will be understood that the invention is capable of modification and variation and is limited only by the following claims.

What is claimed is:

1. A load bearing solenoid operated valve assembly comprising:
   (a) a unitary body member of non-magnetic material having one end thereof with first external surfaces adapted for connection to a first load applying member and having an end distal the one end having a fluid pressure inlet port therein and having second external surfaces thereon adapted for connection to a second load applying member opposite said one load applying member;
   (b) at least one side port formed in said body and communicating with the pressure inlet port;
   (c) an annular flux collector disposed on the body;
   (d) a sleeve including magnetically permeable material, the sleeve being disposed over said side port and moveable on the body between a position preventing and a position permitting flow through the side port;
   (e) an annular pole piece disposed on said body spaced from said sleeve and distal said flux collector; and,
   (f) a coil of electrically conductive material disposed about the sleeve, wherein upon energization of the coil the sleeve is moved to the position preventing flow, wherein said body is a load bearing member when connected to a first and second load applying member respectively on said first and second external surfaces.

2. The assembly defined in claim 1, wherein the sleeve is a unitary member formed of magnetically permeable material.

3. The assembly defined in claim 1, further comprising a spring biasing the sleeve to the position permitting flow through the side port.

4. The assembly defined in claim 1, wherein said annular flux collector defines a port communicating with said at least one side port.

5. The assembly defined in claim 1, wherein said second surfaces include surfaces disposed concentrically about the inlet port.

6. The assembly defined in claim 1, wherein said first surfaces comprise internal threads formed in the body.

7. The assembly defined in claim 1, wherein said sleeve has at least one cross-port therethrough.

8. The assembly defined in claim 1, wherein said second surfaces include external threads.

9. The assembly defined in claim 1, wherein said first surfaces define a bore with terminals disposed therein accessible externally for electrical connection to the coil.

10. The assembly defined in claim 1, wherein flow through the outlet port is in a direction substantially parallel to the pressure inlet port.

11. The assembly defined in claim 1, wherein the inlet port and said first and second body surfaces are co-axially aligned.

12. A method of making a load bearing solenoid operated valve comprising:
   (a) forming first external surfaces on one end of a body member adapted for bearing a load applied thereon in a certain direction and forming second external surfaces adapted for bearing a load thereon in the certain direction on a second end of the body distal the one end and forming a fluid pressure inlet port in the second end;
   (b) forming in the body at least one side port communicating with the inlet port;
   (c) disposing an annular flux collector on the body;
   (d) disposing a magnetizable sleeve over the body and moving the sleeve between a first position permitting and a second position preventing flow through the side port;
   (e) disposing an annular pole piece on the body and spacing the pole piece axially from the sleeve to form an air gap with the sleeve;
   (f) disposing a coil of electrically conductive material over the sleeve and energizing the coil and moving the sleeve to the position preventing flow.

13. The method defined in claim 12, wherein the step of disposing an annular flux collector includes forming an outlet port therein, and the step of disposing a sleeve includes forming at least one cross port in the sleeve and continuously communicating the cross port with the outlet port.

14. The method defined in claim 12, wherein the step of forming first surfaces on one end of the body member includes forming internal threads in the body member.

15. The method defined in claim 12, wherein the step of forming second surfaces on a second end of the body member includes forming external threads.

16. The method defined in claim 12, wherein the step of forming second surfaces on a second end of the body member includes forming surfaces about the pressure inlet port.

17. The method defined in claim 12, further comprising forming an outlet port in the flux collector.

18. The method defined in claim 12, wherein the step of disposing a coil includes winding the coil on a bobbin.

19. The method defined in claim 12, wherein the step of disposing a sleeve includes forming a plurality of circumferentially spaced radially extending passages in the sleeve.

20. The method defined in claim 12, wherein the step of disposing a sleeve includes spring biasing the sleeve toward the position permitting flow.

21. The method defined in claim 12, wherein the step of disposing an annular pole piece includes disposing a portion of the pole piece within the coil.

22. The method defined in claim 12, wherein the step of disposing a sleeve includes disposing a portion of the sleeve within the coil.

* * * * *